US008437249B2

(12) United States Patent
Gossain

(10) Patent No.: US 8,437,249 B2
(45) Date of Patent: May 7, 2013

(54) METHOD FOR COMMUNICATING CHANNEL OPERATION INFORMATION WITHIN A WIRELESS COMMUNICATION SYSTEM

(75) Inventor: Hrishikesh Gossain, Lake Mary, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 471 days.

(21) Appl. No.: 12/474,656

(22) Filed: May 29, 2009

(65) Prior Publication Data

US 2010/0303024 A1    Dec. 2, 2010

(51) Int. Cl.
*H04L 12/26*    (2006.01)
(52) U.S. Cl.
USPC .......................................................... 370/225
(58) Field of Classification Search ................... None
See application file for complete search history.

(56) References Cited

U.S. PATENT DOCUMENTS

| 5,991,263 | A * | 11/1999 | Bales et al. .................. | 370/225 |
| 6,308,282 | B1 * | 10/2001 | Huang et al. .................. | 714/4.3 |
| 7,120,138 | B2 | 10/2006 | Soomro et al. | |
| 7,149,205 | B2 | 12/2006 | Nakamura et al. | |
| 2006/0242457 | A1 | 10/2006 | Roy et al. | |
| 2008/0279103 | A1* | 11/2008 | Yong et al. .................. | 370/235 |
| 2009/0252178 | A1* | 10/2009 | Huttunen et al. ............. | 370/445 |

FOREIGN PATENT DOCUMENTS

WO    2010047913 A2    4/2010

OTHER PUBLICATIONS

International Search Report & Written Opinion for International Application No. PCT/US2010/033974 mailed on Aug. 12, 2010.
Bare D W: "Dynamic Frequency Selection Requirements" Electromagnetic Compatibility, 2008, IEEE International Symposium on, IEEE, Piscataway, NJ, USA, Aug. 18, 2008, pp. 1-18.
International Preliminary Report on Patentability & Written Opinion for International Application No. PCT/US2010/033974 mailed on Nov. 29, 2011.
IEEE: "IEEE P802.11nTM/D2.00 Draft Standard for Information Technology—Telecommunications and Information Exchange between Systems—Local and Metropolitan Area Networks-Specific Requirements-Part 11: Wireless LAN Medium Access Control (MAC) and Physical Layer (PHY) Specifications:" Feb. 1, 2007, pp. 199-202.
IEEE 802.11n D5.0 Part II: Wireless LAN Medium Access Conrol (MAC) and Physical layer (PHY) specifications—Amendment 5: Enhancements for Higher Throughput—(Section 11.9.7.2 and 11.14.3.4)—2008—7 pages.

(Continued)

*Primary Examiner* — Raj Jain

(57) ABSTRACT

A node in a wireless communication system detects a requirement to discontinue communications on a primary channel. In response, the node sends a message to a plurality of nodes, which includes a reason for discontinuation of communications on the primary channel and availability of immediate operation of a secondary channel. The secondary channel is a channel the node was currently using for its communication. Another node receives a message including a requirement to discontinue communications on a primary channel and also the availability of immediate operation on a secondary channel. The receiving node detects the feasibility of moving the operation of its associated network to the secondary channel. When feasible, the node sends a message to other nodes to make the secondary channel its primary channel.

17 Claims, 3 Drawing Sheets

OTHER PUBLICATIONS

ETSI EN 301 893 V1.4.1, Broadband Radio Access Networks (BRAN); 5 GHz high performance RLAN; Harmonized EN covering essential requirements of article 3.2 of the R&TTE Directive—(Section 4-7: Dynamic Frequency Selection (DFS) and Annex D: DFS parameters)—8 pages—Jul. 2007.

* cited by examiner

METHOD FOR COMMUNICATING CHANNEL OPERATION INFORMATION WITHIN A WIRELESS COMMUNICATION SYSTEM

FIELD OF THE DISCLOSURE

The present disclosure relates generally to wireless communications and more particularly to a method for communicating channel operation information within a wireless communication system.

BACKGROUND

In recent years, a type of mobile communications network known as an ad-hoc network has been developed. An ad-hoc network typically includes a number of geographically-distributed, potentially mobile units, sometimes referred to as "nodes," which are wirelessly connected to each other by one or more links (e.g., radio frequency communication channels). In this type of network, each mobile node is capable of operating as a base station or router for the other mobile nodes, thus eliminating the need for a fixed infrastructure of base stations.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using Mesh Point Roots (MPR) which provide wireless nodes with access to a wired backhaul. A mesh network therefore typically comprises one or more Mesh Point Roots (MPR), and a number of Mesh Points including Routers and Mobile Nodes. Routers provide data service to mobile nodes. A Router can connect to a MPR directly or through a multi-hop route. More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet.

Typically, in a mesh network a MPR communicates with the Mesh Points (routers and mobile nodes) by transmitting and receiving packets on radio channels. In certain cases, the MPR switches the channel on which it is communicating with the MPs. For example, the MPR switches its channel when it detects a Radar signal on the channel. If during operation, a MPR detects a radar event over the Radio Frequency (RF) channel that the network backhaul uses, it must immediately change to another available radio frequency (RF) channel. This is dictated by Federal Communications Commission (FCC) and European Telecommunications Standards Institute (ETSI) standards, and is established to allow the sharing of the five Gigahertz (5 GHz) spectrum between wireless LAN (WLAN) and military or weather radars that use the same frequencies. Alternatively, the MPR can switch channel if it detects a need for a periodic scan, or if it detects a weak radio link with the MPs.

In some traditional mesh systems, it takes significant amount of time for a MP to detect the loss of a MPR when the MPR switches its channel of operation. Conventionally, a MP will detect a lost connection with a MPR after missing infrastructure hello frames or by timing out. Also, additional time is spent by the MP in scanning for new channels and then associating with the same or a new MPR. Generally, during the transition period of the channel switch operation at the MPR, associated MPs are unable to provide meshing services to their clients.

A recent amendment to the Institute of Electrical and Electronics Engineers (IEEE) 802.11n standard provides the flexibility for a router and/or a station (STA)/mobile node (MN) to operate in either 20 or 20/40 Megahertz (MHz) channels. (For this and any IEEE standards recited herein, see: http://standards.ieee.org/getieee802/index.html or contact the IEEE at IEEE, 445 Hoes Lane, PO Box 1331, Piscataway, N.J. 08855-1331, USA.) Devices operating in 20/40 MHz bandwidth can dynamically transmit in either 20 or 40 MHz channels (depending on clear channel assessment). In this situation, one of these channels is identified as the primary channel and it is essential for a MP to have its primary channel free of radar signals to operate. As discussed previously herein, when a MP detects a radar signal in its primary channel, it will cease its operation within the Channel Move Time and for the Non-Occupancy Period. After radar's presence is detected, all transmissions shall cease on the operating channel within 10 seconds, which is the value of channel move time. The aggregate duration of all transmissions on this channel during the channel move time shall be limited to 260 milliseconds (ms) which is the value of Channel Closing Transmission Time. See, for example, European Telecommunications Standards Institute (ETSI) Digital Mobile Radio (DMR) specification (ETSI EN 301 893). Any of the ETSI standards or specifications referred to herein may be obtained at http://www.etsi.org/WebSite/Standards/Standard.aspx or by contacting ETSI at ETSI Secretariat, 650, route des Lucioles, 06921 Sophia-Antipolis Cedex, FRANCE.

In addition, intermittent management and control signals can be sent during the remaining time to facilitate vacating the operating channel. A channel that has been flagged as containing a radar system, either by a channel availability check or in-service monitoring, is subject to a non-occupancy period of at least 30 minutes. The non-occupancy period starts at the time when the radar system is detected. In general, the ceasing of operation by the MP as required will result in communications service disruption for the subscriber stations (STAs)/mobile nodes that depend upon the MP.

One disadvantage of the router ceasing operation is that even if the secondary channel is available and free of radar signals, the router will cease its operation for the Non-Occupancy Period, until its primary channel becomes free. This issue may become more severe for IEEE 802.11 VHT (Very High Throughput) which is suggesting 80 MHz operation.

Accordingly, there is a need for a method for communicating primary and secondary channel communication information within a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
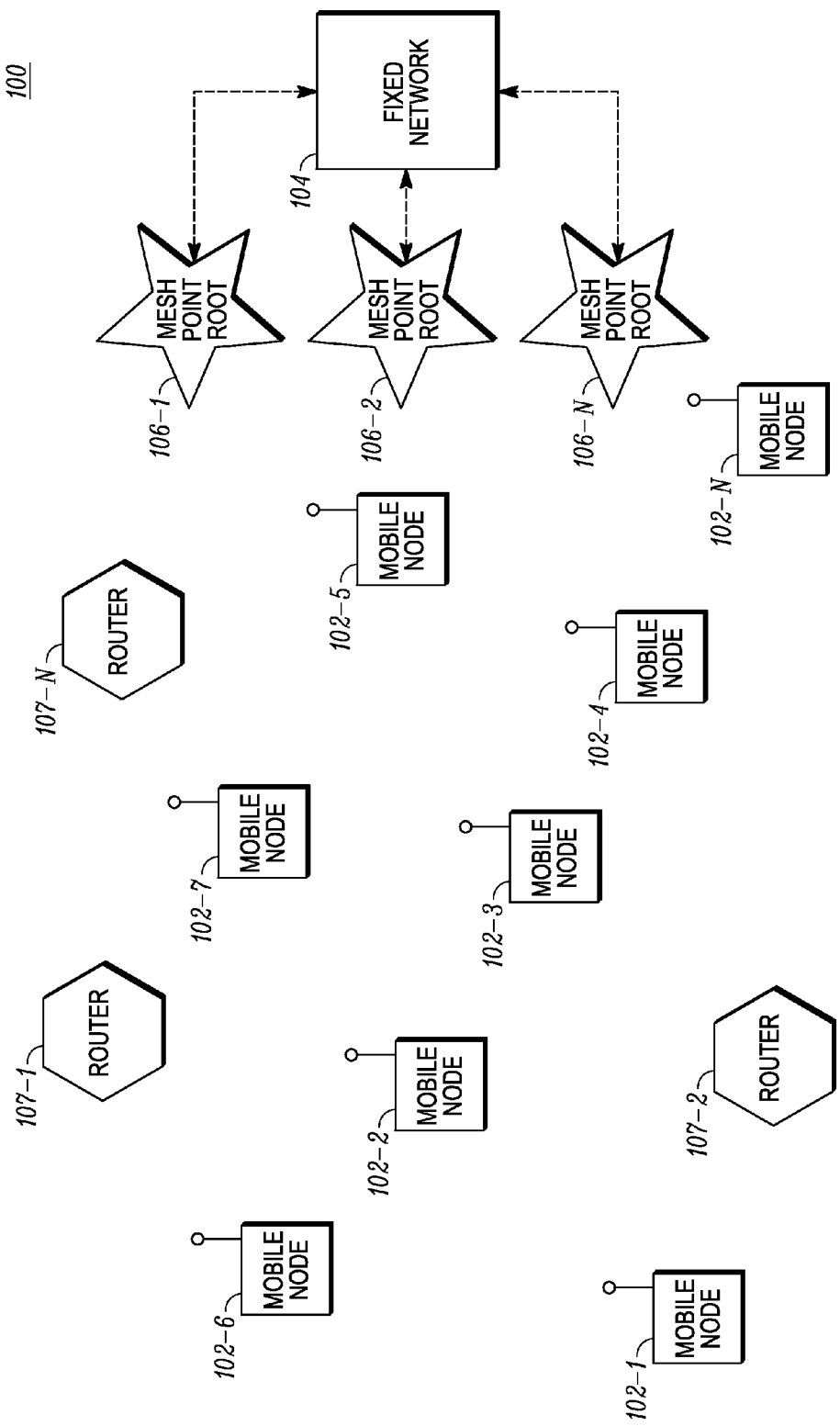
FIG. 1 is a block diagram illustrating an example of a wireless communications system employing a method in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, a node in a wireless communication system detects a requirement to discontinue communications on a first channel (i.e. a primary channel). In response, the node sends a message to a plurality of nodes (single or multi-hop), the message including at least a reason for discontinuation of communications on the first channel and availability of immediate operation of one or more secondary channels. Each secondary channel is a channel the node was currently using for its communication.

Pursuant to various other embodiments, a node (i.e. a gateway) in a wireless communication system receives a message from another node, the message including a requirement to discontinue communications on a first channel (or primary channel) and also the availability of immediate operation on one or more secondary channels. The receiving node detects the feasibility of moving the operation of its associated network to one of the secondary channels based on information it maintains and information received in the message. When feasible, the node sends a message to the nodes in the network to make one of the secondary channels its primary channel after a given period of time.

Referring now to the drawings, and in particular FIG. 1, a wireless communication system is shown and indicated at 100. In accordance with some embodiments, nodes in the wireless communication system 100 implement a method to communicate messages regarding the operation of a primary channel and one or more secondary channels with other nodes. Those skilled in the art will recognize and appreciate that the specifics of this example are merely illustrative of various embodiments and that the teachings set forth herein are applicable in a variety of alternative settings. For example, in some embodiments, the nodes in the wireless communication system 100 operate in accordance with standards promulgated by Institute of Electrical and Electronics Engineers (IEEE), such as IEEE for 802.11(n), 802.11(s), 802.11(u), 802.11(k), and 802.11(h). (For this and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the teachings disclosed herein are not limited to any particular system implementation. As such, other alternate implementations using different communications systems operating on different protocols are contemplated and within the scope of the various teachings described herein. Generally, the teachings disclosed herein are applicable in any wireless communication system which can dynamically alter their topology and/or operational parameters to respond to the needs of a particular user while enforcing operating and regulatory policies and optimizing overall network performance. Cognitive networks are examples of such smart networks.

As illustrated in FIG. 1, the communication network 100 includes a plurality of mobile nodes 102-1 through 102-n (referred to generally as nodes 102 or mobile nodes 102 or mobile communication devices 102 or mesh points 102), and can, but is not required to, include a fixed network 104 having a plurality of Mesh Point Roots (MPR) 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, a public switched telephone network (PSTN) and the Internet. The communication network 100 further can include a plurality of fixed or mobile routers (MR) 107-1 through 107-n (referred to generally as nodes 107 or communication devices 107) for routing data packets between other nodes 102, 106 or 107. It is noted that for purposes of this discussion, the nodes discussed above can be collectively referred to as "nodes 102, 106 and 107", or simply "nodes" or alternatively as "communication devices."

As can be appreciated by one skilled in the art, the nodes 102, 106 and 107 are capable of communicating with each other directly or indirectly. When communicating indirectly, one or more other nodes 102, 106 or 107, can operate as a router or routers for forwarding or relaying packets being sent between nodes.

For clarity, a Mesh Point is, for example, an IEEE 802.11 entity that contains an IEEE 802.11 conformant Medium Access Control (MAC) and Physical Layer (PHY) interface to the Wireless Medium (WM), is within a wireless local area network (WLAN) Mesh, and supports WLAN Mesh Services. A Mesh Access Point (AP) is any Mesh Point that is also an Access Point. A Mesh Point Root (MPR) is a point at which mobile subscriber devices exit and enter a wireless local area network (WLAN) Mesh to and from other parts of a communication network.

Mesh Network deployments are engineered to ensure an interconnected backhaul network of mesh routers exists. The mesh routers form a tree below a particular Mesh Point Root. From a network graph perspective mesh network deployments tend to be fairly sparse and tree-like. This style of deployment is chosen to reduce the number of mesh routers required to cover a particular area and therefore reduce overall network cost.

In accordance with some embodiments, a method is provided wherein a node within a wireless network can seamlessly move to its secondary channel, for example, when a radar signal is detected in its primary channel. Since the node already has already completed a Channel Availability Check (CAC) process for the secondary channel, it starts its operation immediately without any service disruption. After changing its primary channel to its secondary channel, the node initiates a CAC in its adjacent radar free channel. If the channel is observed to be free of radar signals for CAC duration, the node can start operation in 40 MHz mode, for example.

Figure 2:
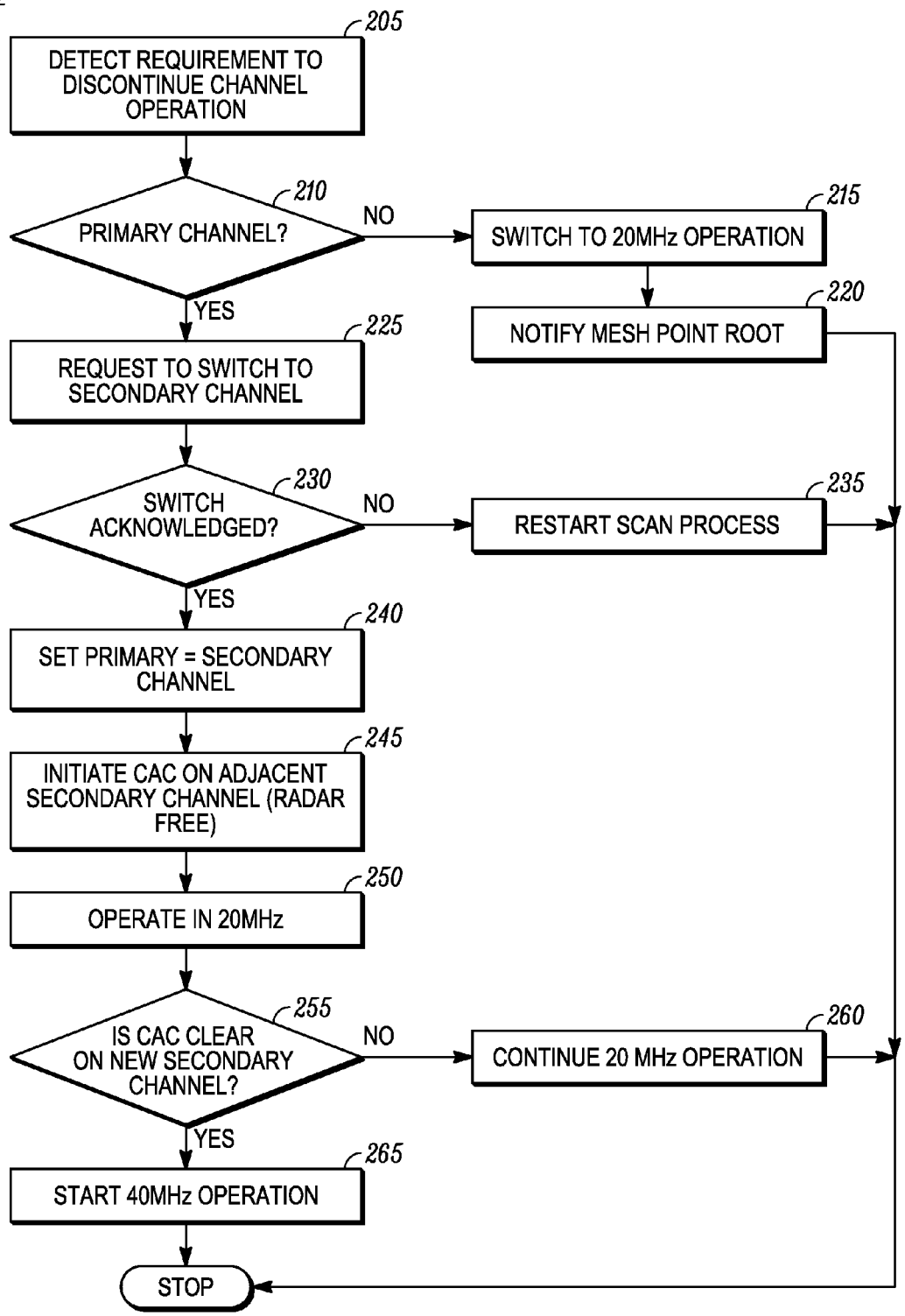
FIG. 2 is a flowchart of a method of channel switching at a node in accordance with some embodiments.

Referring now to FIG. 2, a flow diagram illustrating a method 200 of channel switching at a node in accordance with some embodiments is shown. In general, the method 200 can be implemented at any node such as the nodes 102, 106, and 107 of FIG. 1. It will be appreciated by those of ordinary skill in the art that the method 200 illustrated by reference to FIG. 2 includes functionality that may be performed in hardware, firmware, software or a combination thereof and may further be performed at a single node or a combination of nodes in the wireless communication system 100. Also, one or more steps of the method 200 can be performed at supporting hardware units external to the nodes.

Illustrative details for implementing the method 200 will next be described. In general, the method 200 is a procedure for announcing the need for a channel switch operation including potential channels for communications in a wireless communication system.

It will be appreciated by those of ordinary skill in the art that although the base bandwidth, for illustrative purposes, is described at 20 MHz for both primary and secondary channel, any appropriate bandwidth can be implemented. For example, primary and secondary channels could be 10 MHz bandwidth.

At step 205, a node in the wireless communication system detects a requirement to discontinue communications on one of a primary channel or a secondary channel. In one embodiment, the detecting comprises detecting a radar signal on one of a primary channel or a secondary channel. The channel, for example, can be a 20 MHz channel. In an alternate embodiment, the detecting comprises detecting congestion at the node. Generally, the state of congestion at a node is determined based on the link quality of the node with associated nodes. In yet another embodiment, the determining comprises detecting a need for a periodic scan at the node. For example, a node in a wireless communication system can periodically scan available channels to find the best available channel.

Next, in Step 210, the node determines whether the detected requirement to discontinue communications is for a primary channel. When the channel is not a primary channel, in other words, is a secondary channel, the operation continues to Step 215 in which the node disables the secondary channel for a period of time. For example, the node can disable the secondary channel for a non-occupancy period of at least 30 minutes. During the disabled time, the node can switch operation of the primary channel. For example, the node can switch to 20 MHz operation of the primary channel.

Next, in Step 220, the node can request its access point to change its secondary channel to another channel. For example, a mesh point can request its mesh point root to change its secondary channel to a radar free channel (when the discontinuation is due to radar on the channel) so that 40 MHz operation can be restarted. Further, the MPR can decide to switch its secondary channel of operation to an alternate channel based on its associated MP information. The operation then ends.

Returning to Step 210, when the requirement to discontinue communications is for the primary channel, (for example, a radar signal is present in the primary channel), the operation continues to Step 225 in which the node (i.e. a mesh point) sends a request (multi-hop) to its portal (i.e. its mesh point root) to make one of the secondary channels as primary channel for future channel of operation. In general, the request to switch channels comprises at least a reason for discontinuation of communications on the primary channel, duration of channel switch operation (transition phase duration), information about originator device type, and a list of secondary channels. In accordance with some embodiments the secondary channels are identified by the node by scanning a list of available channels. In one embodiment, when the reason for discontinuation of communication at the first channel is detection of radar signal, the duration for the channel switch operation is less than equal to "CHANNEL_MOVE_TIME" which is defined by regularity authorities such as Federal Communications Commission (FCC) and European Telecommunications Standards Institute (ETSI).

The request can be transmitted from the mesh point to the mesh point root, for example, by forwarding the message across multiple hops until the request indicating the channel switch operation is received by the mesh point root. In accordance with some embodiments, the node multicasts or broadcasts the request to all associated nodes which have a direct radio link with the node. These nodes, in turn can forward the message by multicasting or broadcasting the mesh point root which may be indirectly (multi-hop) associated with the node. In accordance with other embodiments, the node can identify a best route to the mesh point root and forward (multi-hop) the request to the mesh point root along the best route. In accordance with still other embodiments, the node can directly transmit the request to the mesh point root when it is a single hop away from the mesh point root.

Next, in Step 230, the node determines if the request is accepted by the mesh point root. When the node receives a negative response, the operation continues to Step 235 in which the node restarts its scanning process. The operation then ends.

When the node receives an affirmative response to switch from the primary channel to a secondary channel in Step 230, the operation continues to Step 240 in which the node changes its primary channel of operation to the secondary channel at the designated time. In one embodiment, when more than one secondary channel was included in the request message, the node receives an identified secondary channel to switch its operation from the mesh point root in the received response. In another embodiment, when more than one secondary channel was included in the request message, the node receives an identified secondary channel to switch its operation from a central authority within the network. It will be appreciated by those of ordinary skill in the art that the response can be received directly (i.e. single hop) from the mesh point root or alternatively can be received from one or more previous hop nodes (i.e. multi-hop) from the mesh point root.

Next, in Step 245, the node initiates CAC on an adjacent channel (i.e. a 20 MHz channel) that is free from a radar signal. Next, in Step 250, the node starts operation on the secondary channel, for example, in 20 MHz mode.

Next, in Step 255, the node determines whether the secondary channel is cleared for communication. When the secondary channel is not clear, for example, when radar is detected on the adjacent channel, the operation continues to Step 260 in which the node continues to operate in 20 MHz mode and reports the radar detection to its mesh point root. The operation then ends.

When the node determines that the secondary channel is cleared for communication, for example, no radar is detected in the adjacent channel, the operation continues to Step 265 in which the node begins 40 MHz operation. The operation then ends.

Figure 3:
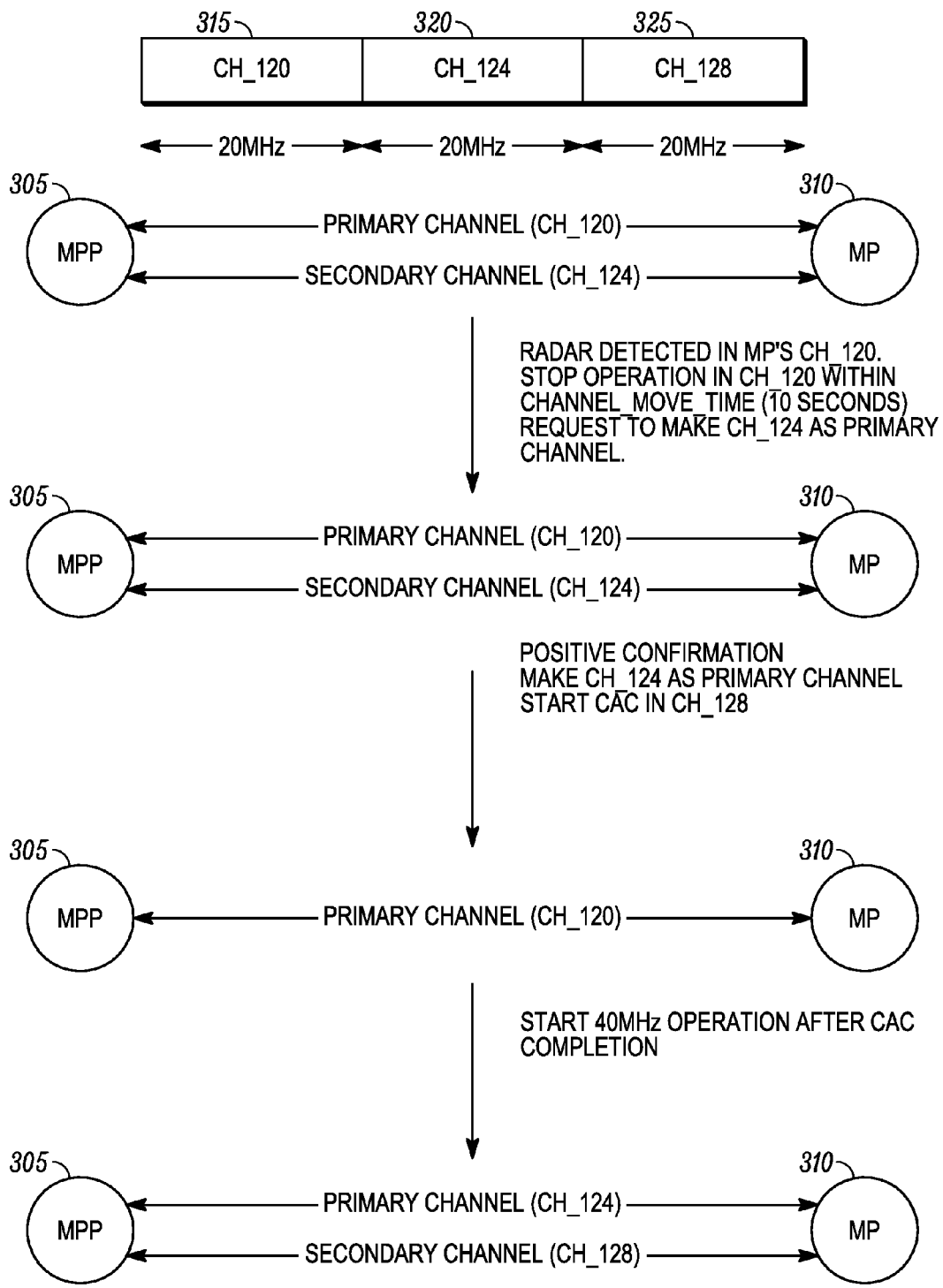
FIG. 3 illustrates an example scenario of the implementation of a method of channel switching in accordance with some embodiments.

FIG. 3 illustrates an example scenario 300 of the implementation of a method of channel switching in accordance with some embodiments. Specifically, FIG. 3 illustrates a scenario 300 for channel switching between a Mesh Point (MP) 310 and its associated Mesh Point Root (MPR) 305.

As illustrated, the MPR 305 and MP 310 begin by operating on a primary channel CH_120 315 and a secondary channel CH_124 320 which each have a bandwidth of 20 MHz. When radar is detected by the MP 310 in the CH_120 315, the MP 310 stops operation in CH_120 within CHANNEL_MOVE_TIME (typically of 10 seconds). MP 310 makes a request to MPR 305 to move primary channel operation to CH_124 320. Thereafter, when a positive confirmation is received by MP 310 from MPR 305, MP makes CH_124 320 its primary channel and starts CAC in adjacent channel CH_128 325 which also has a bandwidth of 20 MHz. After CAC completion, MP 310 makes CH_128 325 its secondary channel of operation with MPR 305.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for communicating channel operation information within a wireless communication system, the method comprising: operating a node in a first mode on a first channel and one or more secondary channels; detecting a requirement to discontinue communications on the first channel by the node; transmitting by the node, in response to the requirement, a message to a plurality of other nodes, the message including at least a reason for discontinuation of communications on the first channel and availability of immediate operation of the node in a second mode on the one or more secondary channels, wherein each secondary channel comprises a channel the node was currently using for communication;

wherein the first channel comprises a primary channel used for sending a request from the node to its portal to make one of the secondary channels a primary channel for future operation, the node comprises a mesh point and the portal comprise a mesh point root, and forwarding the sending request from the mesh point across multiple hops until the request is received by the mesh point root; and wherein sending the request comprises one of multicasting and broadcasting the request from the mesh point to all associated nodes which have a direct radio link with the mesh point, and forwarding the request by one of multicasting or broadcasting the request by the associated nodes across multiple hops until the request is received by the mesh point root.

2. A method as claimed in claim 1, wherein the first channel comprises one of a primary channel and a secondary channel.

3. A method as claimed in claim 1, further comprising prior to the transmitting step:

identifying the one or more secondary channels by the node by scanning a list of available channels.

4. A method as claimed in claim 1, wherein the detection of the requirement to discontinue communications on the first channel comprises one or more of a detection of a radar signal on the first channel, a detection of congestion on the first channel, a detection of a need for a periodic scan at the node.

5. A method as claimed in claim 1, further comprising:
receiving the message by at least one of the plurality of other nodes;
determining a feasibility of moving operation of its associated network to one of the secondary channels based on information it maintains and information received in the message; and
when feasible, sending a message by the at least one other node to one or more nodes in the associated network to make one of the secondary channels its primary channel after a given period of time.

6. A method as claimed in claim 1, further comprising:
completing a Channel Availability Check (CAC) process for each of the secondary channels by the node prior to the detection of the requirement to discontinue communications on the primary channel.

7. A method as claimed in claim 1, further comprising:
operating the node in the second mode on one of the secondary channels; and
initiating a Channel Availability Check (CAC) process on an adjacent channel.

8. A method as claimed in claim 7, further comprising:
switching operation of the node to the first mode when the adjacent channel is free of interfering signals for a CAC duration.

9. A method as claimed in claim 8, wherein the interfering signals comprises one or more radar signals.

10. A method as claimed in claim 9, further comprising:
switching operation of a primary channel of the node during the period of time.

11. A method as claimed in claim 1, wherein the first channel comprises a secondary channel, the method further comprising:
disabling the secondary channel for a period of time.

12. A method as claimed in claim 11, wherein the interfering signals comprises one or more radar signals, and wherein disabling the secondary occurs within a CHANNEL MOVE TIME.

13. A method as claimed in claim 11, wherein the period of time comprises a non-occupancy period.

14. A method as claimed in claim 1, wherein the request to switch channels comprises one or more of a reason for discontinuation of communications on the primary channel, a duration of a channel switch operation, an information about an originator device type, and a list of secondary channels.

15. A method as claimed in claim 1, further comprising:
receiving an affirmative response by the node from the portal to switch from the primary channel to a secondary channel; and switching the primary channel of operation of the node to a secondary channel at a designated time.

16. A method as claimed in claim 15, wherein the affirmative response further comprises an identification of the secondary channel for switching operation.

17. A method as claimed in claim 15, further comprising:
receiving an identification of the secondary channel for switching operation from a central authority within the wireless communication system.

* * * * *